United States Patent [19]
Shepherd et al.

[11] 3,990,381
[45] *Nov. 9, 1976

[54] HYDROPHILIC POLYMER COATING FOR UNDERWATER STRUCTURES

[75] Inventors: Thomas H. Shepherd, Hopewell; Francis E. Gould, Princeton, both of N.J.

[73] Assignee: National Patent Development Corporation, New York, N.Y.

[ * ] Notice: The portion of the term of this patent subsequent to Apr. 13, 1988, has been disclaimed.

[22] Filed: Sept. 27, 1974

[21] Appl. No.: 510,125

Related U.S. Application Data

[60] Division of Ser. No. 106,374, Jan. 14, 1971, Pat. No. 3,896,753, which is a continuation-in-part of Ser. No. 838,269, July 1, 1969, Pat. No. 3,575,123, which is a continuation-in-part of Ser. No. 654,044, July 5, 1967, abandoned, which is a continuation-in-part of Ser. No. 650,259, June 30, 1967, abandoned, which is a continuation-in-part of Ser. No. 567,850, July 26, 1966, Pat. No. 3,520,949.

[52] U.S. Cl. .......................... 114/67 R; 106/15 R; 427/265; 427/287; 427/408; 427/409; 427/414; 427/415
[51] Int. Cl.² ................................. C03C 17/00
[58] Field of Search .......... 114/67 R; 427/265, 287, 427/408, 409, 414, 415; 106/15 AF

[56] References Cited
UNITED STATES PATENTS

| | | | |
|---|---|---|---|
| 2,838,419 | 6/1958 | Francis | 427/415 |
| 3,154,460 | 10/1964 | Graner | 114/67 R |
| 3,234,032 | 2/1966 | Leebrick | 106/15 AF |
| 3,266,913 | 8/1966 | Hardy et al. | 106/15 AF |
| 3,331,693 | 7/1967 | Taylor | 106/15 AF |
| 3,575,123 | 4/1971 | Shepherd et al. | 114/67 R |

FOREIGN PATENTS OR APPLICATIONS

| | | | |
|---|---|---|---|
| 2,050,794 | 5/1971 | France | 67 R/ |
| 2,101,074 | 6/1971 | Germany | 409/ |
| 688,198 | 7/1953 | United Kingdom | 427/408 |

*Primary Examiner*—Ronald H. Smith
*Assistant Examiner*—Dennis C. Konopacki
*Attorney, Agent, or Firm*—Cushman, Darby & Cushman

[57] ABSTRACT

Hydrophilic polymers, i.e., hydrophilic cellulose esters, hydrophilic cellulose ethers, hydrophilic polyurethanes, hydrophilic vinyl lower alkyl ether polymers, vinyl alcohol group containing polymers, partially hydrolized polyacrylonitrite, ethylene-maleic anhydride copolymer, stryene-maleic anhydride copolymer, proteins, high molecular weight polyalkylene oxides or phenoxy resins, having encapsulated therein either or both anti-fouling agents or pigments is applied as a coating to underwater portions of a marine structure so as to reduce the drag of said structure.

62 Claims, 2 Drawing Figures

HYDROPHILIC POLYMER COATING FOR UNDERWATER STRUCTURES

CROSS REFERENCES TO RELATED APPLICATIONS

This application is a division of application Ser. No. 106,374, filed Jan. 14, 1971 now U.S. Pat. No. 3,896,753 which is a continuation-in-part of application 838,269, filed July 1, 1969 now U.S. Pat. No. 3,575,123, which is a continuation-in-part of application 654,044, filed July 5, 1967 now abandoned, which is a continuation-in-part of application 650,259, filed June 30, 1967, and now abandoned, which is a continuation-in-part of application 567,850, filed July 26, 1966, and now U.S. Pat. No. 3,520,949; July 21, 1970.

BACKGROUND OF THE INVENTION

The present invention relates to drag reducing coatings for surfaces moving through water or surfaces against which water is flowing.

It is an object of the present invention to reduce the resistance or drag developed on moving watercraft through water.

Another object is to develop novel anti-foulant compositions.

A further object is to provide watercraft and underwater static structures with an improved anti-foulant coating.

Still further objects and the entire scope of applicability of the present invention will become apparent from the detailed description given hereinafter; it should be understood, however, that the detailed description and specific examples, while indicating preferred embodiment of the invention, are given by way of illustration only, since various changes and modifications within the spirit and scope of the invention will become apparent to those skilled in the art from this detailed description.

SUMMARY OF THE INVENTION

It has been found that these objects can be obtained by using coatings comprising film forming polymers which have the ability to absorb water, but which are insoluble in water, and remain intact, swollen on the surface thereby coated, as coatings at least for the underwater portion of watercraft and underwater static structures.

Many conventional water-soluble polymers are useful in the practice of this invention, if, after application to the surface they are crosslinked to render them insoluble. The optimum amount of water absorption to obtain maximum drag reducing effect varies somewhat with the composition of the polymer, film thickness, etc., but in general the polymer must absorb a minimum of about 10% by weight of water to be effective. Preferably, it should absorb 20% of water to 120%, and it can absorb even more, e.g. 500% or 2,000% by weight.

The term marine coating is used in the present application and claims to cover both coatings for watercraft and underwater static structures. The term watercraft includes movable beats of all kinds, including, but not limited to sailboats, yachts, inboard and outboard motor boats, rowboats, motor launches, canoes, Kayaks, water skis, surfboards, ocean liners, tugboats, tankers and other cargo ships, submarines, both of the atomic and conventional varieties, aircraft carriers, destroyers, etc. Underwater static structures include, but are not limited to wharves, piers, permanently moored watercraft, pilings, bridge substructures, underwater oil well structures, etc. The underwater surface can be made of wood, metal, plastic, fiberglass, concrete or other material.

The anti-foulant compositions are useful as marine coatings to render the structure (moving or static) resistant to fouling by marine organisms such as barnacles, algae, slime, acorn-shells (Balanidae) goose mussels (Lepadoids), tube-worms, sea moss, oysters, brozoans, tunicates, etc.

It is critical that the hydrophilic polymer, e.g. acrylic resin, be water insoluble, or rendered water insoluble, since otherwise it will not be permanently affixed to the underwater surface.

The coatings of the invention effectively reduce the "drag" or resistance developed on moving the coated surface through water.

If it is desired to employ the coating solely to effect friction reduction on racing or pleasure craft, for example, which do not remain static in water for extended periods it is not necessary to incorporate an antifouling agent.

While not being bound by any theory it is believed that the mechanism of friction reduction is two-fold. The coating absorbs a substantial percentage of water and the water swollen coating exhibits a low contact angle with the water. In addition, the swollen coatings are soft, (particularly if a linear polymer is employed) and the softness can provide a hydrodynamic damping effect and reduce turbulence of the flow.

As stated in parent case 838,269, preferably the hydrophilic monomer employed is a hydroxy lower alkyl acrylate or methacrylate or hydroxy lower alkoxy lower alkyl acrylate or methacrylate, e.g. 2-hydroxyethyl acrylate, 2-hydroxyethyl methacrylate, diethylene glycol monoacrylate, diethylene glycol monomethacrylate, 2-hydroxypropyl acrylate, 2-hydroxypropyl methacrylate, 3-hydroxypropyl acrylate, 3-hydroxypropyl methacrylate, dipropylene glycol monomethacrylate and dipropylene glycol monoacrylate. The most preferred monomers are the hydroxyalkyl acrylates and methacrylates, particularly 2-hydroxyethyl methacrylate.

There can also be employed polymers of acrylate, methacrylamide, n-alkyl substituted acrylamide and methacrylamide such as N-propylacrylamide, N-isopropyl acrylamide, N-isopropyl methacrylamide, N-propyl methacrylamide, N-butyl acrylamide, N-methyl acrylamide and N-methyl methacrylamide, diacetone acrylamide, N-(2-hydroxyethyl) acrylamide and N-(2-hydroxyethyl) methacrylamide.

Likewise, there can be employed copolymers of these monomers with each other or with other copolymerizable monomers. In fact, if the hydrophilic monomer gives a product which is water soluble, e.g. polyacrylamide, it is necessary to employ a copolymerizable monomer to render it only water swellable, rather than water soluble. The copolymerizable monomer can be used in an amount of 0.05 to 50%. Preferably, comonomers include methyl acrylate, ethyl acrylate, isopropyl acrylate, propyl acrylate, butyl acrylate, sec. butyl acrylate, pentyl acrylate, 2-ethylhexyl acrylate, methyl methacrylate, ethyl methacrylate, propyl methacrylate, isopropyl methacrylate, butyl methacrylate, sec. butyl methacrylate, pentyl methacrylate, lower alkoxyethyl acrylates and methacrylates, e.g. methoxyethyl acrylate, methoxyethyl methacrylate, ethomyethyl acrylate and ethoxyethyl methacrylate, triethylene glycol acrylate, triethylene glycol methacrylate, glycerol monoacrylate and glycerol monomethacrylate.

There can also be used unsaturated amines, p-aminostyrene, o-aminostyrene, 2-amino-4-vinyltoluene, alkylamino alkyl acrylates and methacrylates, e.g. diethylaminoethyl acrylate, diethylaminoethyl methacrylate, dimethylaminoethyl acrylate, dimethylaminoethyl methacrylate, t-butylaminoethyl acrylate, t-butylaminoethyl methacrylate, piperidinoethyl acrylate, piperidinoethyl methacrylate, morpholinoethyl acrylate, morpholinoethyl methacrylate, 2-vinylpyridine, 3-vinyl pyridine, 4-vinyl pyridine, 2-ethyl-5-vinylpyridine, dimethylamino propyl acrylate, dimethylamino propyl methacrylate, dipropylaminoethyl acrylate, dipropylaminoethyl methacrylate, di-n-butylaminoethyl acrylate, di-n-butyl aminoethyl methacrylate, di-sec. butylaminoethyl acrylate, di-sec. butylaminoethyl methacrylate, dimethylaminoethyl vinyl ether, diethylaminoethyl vinyl sulfide, diethylaminoethyl vinyl ether, aminoethyl vinyl ether, aminoethyl vinyl sulfide, monomethylaminoethyl vinyl sulfide, monomethylaminoethyl vinyl ether, N-(gamma-monomethylamino) propyl acrylamide, N-(beta-monomethylamino) ethyl acrylamide, N-(beta-monomethylamino) ethyl methacrylamide, 10-aminodecyl vinyl ether, 8-aminooctyl vinyl ether, 5-aminopentyl vinyl ether, 3-aminopropyl vinyl ether, 4-aminobutyl vinyl ether, 2-aminobutyl vinyl ether, monoethylaminoethyl methacrylate, N-(3,5,5-trimethylhexyl) aminoethyl vinyl ether, N-cyclohexylaminoethyl vinyl ether, 2-(1,1,3,3-tetramethylbutylamino) ethyl methacrylate, N-t-butylamino-ethyl vinyl ether, N-methalimino-ethyl vinyl ether, N-2-ethylhexylamino-ethyl vinyl ether, N-t-butylaminoethyl vinyl ether, N-t-octylaminoethyl vinyl ether, 2-pyrrolidinoethyl acrylate, 2-pyrrolidinoethyl methacrylate, 3-(dimethylaminoethyl)-2-hydroxypropyl acrylate, 3-(dimethylaminoethyl) 2-hydroxypropyl methacrylate, 2-aminoethyl acrylate, 2-aminoethyl methacrylate. The presently preferred amino compounds are alkylaminoethyl acrylates and methacrylates, most preferably, t-butyl-aminoethyl methacrylate.

While linear polymers (including both homo and copolymers) are preferred when the hydrophilic resins are used only to reduce the resistance on moving a coated watercraft surface through water there can also be employed crosslinked hydrophilic copolymers. Such cross-linked copolymers are frequently advantageously employed when antifouling agents are included in the composition to insure more permanent adherence to the underwater structure.

Preferably, the cross-linking agent is present in an amount of 0.1 to 2.5%, most preferably, not over 2.0%, although from 0.05 to 15%, or even 20%, of cross-linking agents can be used. Of course, care should be taken that cross-linking agents are not used in an amount which renders the product incapable of absorbint at least 20% of water.

Typical examples of cross-linking agents include ethylene glycol diacrylate, ethylene glycol dimethacrylate, 1,2-butylene dimethacrylate, 1,3-butylene dimethacrylate, 1,4-butylene dimethacrylate, propylene glycol diacrylate, propylene glycol dimethacrylate, diethylene glycol dimethacrylate, dipropylene glycol dimethacrylate, diethylene glycol diacrylate, dipropylene glycol diacrylate, divinyl benzene, divinyl toluene, diallyl tartrate, allyl pyruvate, allyl maleate, divinyl tartrate, triallyl malamine, N,N'-methylene bis acrylamide, glycerine trimethacrylate, diallyl maleate, divinyl ether, diallyl monoethylene glycol citrate, ethylene glycol vinyl allyl citrate, allyl vinyl maleate, diallyl itaconate, ethylene glycol diester of itaconic acid, divinyl sulfone, hexahydro-1,3,5-triacryltriazine, triallyl phosphite, diallyl ester of benzene phosphenic acid, polyester of maleic anhydride with triethylene glycol, polyallyl glucose, e.g. triallyl glucose, polyallyl sucrose, e.g. pentaallyl sucrose, sucrose diacrylate, glucose dimethacrylate, pentaerythritol tetraacrylate, sorbitol, dimethacrylate, diallyl aconitate, divinyl citraconate diallyl fumarate.

There can be included ethylenically unsaturated acids or salts thereof such as acrylic acid, cinnamic acid, carotonic acid, methacrylic acid, itaconic acid aconitic acid, maleic acid, fumaric acid, mesaconic acid and citraconic acid. Also, as previously indicated there can be used partial esters such as mono 2-hydroxypropyl itaconate, mono 2-hydroxyethyl itaconate, mono 2-hydroxyethyl citraconate, mono 2-hydroxypropyl aconitate, mono 2-hydroxyethyl maleate, mono 2-hydroxypropyl fumarate, monomethyl itaconate, monoethyl itaconate, mono Methyl Cellosolve ester of itaconic acid (Methyl Cellosolve is the monomethyl ether of diethylene glycol), Mono Methyl Cellosolve ester of maleic acid.

The polymers can be prepared for use as casting syrups, as aqueous dispersions, by aqueous suspension polymerization or as solutions in organic solvents such as ethyl alcohol, methyl alcohol, propyl alcohol isopropyl alcohol, formamide, dimethyl sulfoxide or other appropriate solvent.

It has now been found that in addition to the polymers set forth in the parent application 838,269, there can also be used as polymers in the practice of this invention polyvinyl alcohol, polyvinyl-N-pyrrolidone, copolymers of vinyl pyrrolidone with other monomers, e.g. methyl methacrylate, cellulose ethers such as methyl cellulose, hydroxyethyl cellulose, hydroxypropyl cellulose, partially hydrolyzed celluloxe esters such as cellulose acetate having a degree of substitution of 1.3 to 2.3, cellulose acetate-propionate and cellulose acetate-butyrate of similar degree of substitution, carboxyl methyl cellulose, etc., vinyl acetate-vinyl alcohol copolymers, e.g. (20:80) poly-methylvinyl ether, polyethylvinyl ether, polyurethanes formed by reaction of polyhydric alcohols such as glycerol, sorbitol, mannitol, pentaerythritol, trimethylolpropane, hexane 1,2,6-triol, mono or polysacchrides such as glucose, sucrose, fructose and demtrin, tris dipropylene glycol phosphonate, tris dipropylene glycol phosphate with an amount of diisocyanate insufficient to react with all the hydroxyl functionality.

Such polyurethanes can have hydroxyl numbers of 100 to 500 and can be made from toluene diisocyanate, 4,4'-methylene bis (phenylisocyanate), oxydi (phenylisocyanate), 4-methoxy-1,3-phenylene diisocyanate or any other conventional diisocyanate or higher polyisocyanates such as those mentioned in U.S. Pat. No. 3,127,373. There can also be used polyurethanes formed by reaction of hydroxyl terminated polyesters with such polyisocyanates providing the hydroxyl groups are in excess. Examples of such polyesters are polyethylene sebacates, the reduction product of an excess of 1,4-butanediol with adipic acid and a small amount of trimethylolpropane of molecular weight 3,000 to 12,000, ethylene glycol-propylene glycol adipate molecular weight 1,900, glyceryl adipate-phthalate. Likewise there can be used polyurethanes made by reacting such polyisocyanates with hydroxyl terminated polyethers, e.g. diethylene glycol, triethylene glycol, dipropylene glycol, polyethylene glycol molecular weights of 200 to 3,000, polypropylene glycol molecular weight of 200 to 3,000, tetramethylene glycol molecular weight 200, 1,000 or 4,000, glycerol-propylene oxide adducts of molecular weight 265, 1,000 or 3,000, hexane 1,2,6-triol-propylene oxide adducts of molecular 500 to 4,000, oxypropylated sucrose. The hydroxyl numbers of such polyurethanes should be as indicated above.

Other suitable hydrophilic polymers include proteinaceous polymers such as casein and gelatin; high molecular weight polyethylene oxide or polypropylene oxide, e.g. molecular weight of 3,000 or above, preferably at least 5,000, polyethylene imine, and water soluble-polyelectrolytes such as polyitaconic acid, polyacrylic acid, partially hydrolyzed polyacrylonitrile vinyl ether-maleic anhydride copolymers, e.g. where the vinyl ether is vinyl ethyl ether, vinyl methyl ether or vinyl butyl ether, ethylene-maleic anhydride copolymers, styrene-maleic anhydride copolymers (preferably containing at least 30% maleic anhydride units), methyl methacrylatemaleic anhydride copolymers hydrolyzed ethylene-vinyl acetate copolymer containing at least 30% vinyl alcohol units, phenoxy resins, e.g. the phenoxy resin of molecular weight 30,000, see U.S. Pat. No. 3,305,526, col. 9, line 60 et seq., polyvinyl acetals containing free hydroxyl groups, e.g. polyvinyl formal-polyvinyl alcohol, polyvinyl butyral-polyvinyl alcohol.

Cross-linking of the applied coatings may be accomplished by a variety of techniques. Curing of polymers containing hydroxyl functionality may be done using ammonium, potassium or sodium chromate or dichromate or other strong oxidizing agents, e.g. in an amount 0.2 to 5% of the solids, Titanates, e.g. tetraisopropyl titanate, tetrabutyl titanate and tin compounds, e.g. stannous dodecanoate, stannous octeate can be used in like amounts. Polymers containing ether groups and vinyl unsaturation may be crosslinked by incorporation of free radical generators such as organic peroxides, e.g. any sodium peroxide, hydrogen peroxide, ammonium or potassium persulfate, organic hydroperoxides, peracids, and peresters.

Examples of suitable per compounds include t-butyl peroctoate, benzoyl peroxide, isopropyl percarbonate, 2,4-dichlorobenzoyl peroxide, methyl ethyl ketone peroxide, cumene hydroperoxide and dicumyl peroxide.

The inclusion of agents to create redox systems with the free radical generators aids in speeding the curing action as is well known in the art.

It is critical, as stated, to render the hydrophilic polymer water insoluble (if it is not already so) while at the same time not destroying the hydrophilic properties.

It is also critical that the hydrophilic polymer form a continuous film outer coating on the watercraft or other structure, i.e., it should not be masked or blocked by a hydrophobic film former for example.

The hydrophilic polymer coatings of the present invention can be coated over conventional antifoulants providing there is sufficient permeability that the bottoms of the water craft are kept clean.

There also can be incorporated with the hydrophilic polymers in the coating compositions of the invention to provide coatings to prevent fouling by marine organisms any of the conventional inorganic or organic antifoulants including cuprous oxide, copper powder, mercuric oxide, cuprous oxide-mercuric oxide, e.g. 3:1 mercurous chloride), organotin compounds including triphenyltin chloride, triphenyltin bromide, tri p-cresyltin chloride, triethyltin chloride, tributyltin chloride, phenyl diethyltin fluoride, tri (p-chlorophenyltin) chloride, tri (x-chlorophenyltin) chloride, dibutyl ethyltin bromide, dibutyloctyltin bromide, tricyclohexyltin chloride, triethyltin stearate, tributyltin stearate, triethyltin fluoride, tributyltin fluoride, diphenyl ethyltin chloride, diphenyl ethyltin fluoride, triphenyltin hydroxide, triphenyltin thiocyanate, triphenyltin trichloroacetate, bributyltin acetate, tributyltin neodecanoate, tributyltin neopentanoate, trioctyltin neodecanoate, tributyltin oxide, trioctyltin oxide, triphenyltin fluoride, tributyltin oleate, tripropyltin neodecanoate, tributyltin laurate, tributyltin octanoate, tributyltin dimethyl carbonate, tributyltin resinate, tributyltin chromate, amyldithyltin neodecannoate, tributyltin naphthanoate, tributyltin isooctylmercaptoacetate, bis (tributyltin) oxalate, bis (tributyltin) malonate, bis (tributyltin) adipate, bis (tributyltin) carbonate, organo lead compounds, e.g. triphenyl lead acetate, triphenyl lead stearate, triphenyl lead neodecanoate, triphenyl lead oleate, triphenyl lead chloride, triphenyl lead laurate, triethyl lead oleate, triethyl lead acetate, triethyl lead stearate, trimethyl lead stearate, triphenyl lead bromide, triphenyl lead fluoride, organic compounds including 10,10'-oxybisphenoxazine (SA-546), 1,2,3-trichloro-4,6-dinitrobenzene, hexachlorophene, dichlorodiphenyl trichloroethane (DDT), phenol mercuric acetate, tetrachloroisophthalonitrile, bis (n-propylsulfonyl) ethylene, etc.

The antifoulant is releasably entrapped in the hydrophilic polymer coating. The quantity of antifouling agent required in the coating, as would be expected, varies with the particular agent used and the severity of fouling tendency encountered in the particular service to which the coated vessel or static structure is to be used. In general, the amount of antifouling agent when employed will range from 2 to 200% of the resin by weight, although as little as 0.1% of anti-foulant can be used based on the resin. The amount of anti-foulant should be insufficient to prevent the hydrophilic polymer from forming a continuous film.

Of course, there can be included in the formulation conventional pigments and fillers such as titanium dioxide, red lead, bone black, red iron oxide, talc, aluminum silicate, fullers earth, pumice, zinc oxide, calcium carbonate, etc.

The coatings of the present invention can be applied to the surfaces to be subjected to underwater conditions from solution in organic solvents or from aqueous dispersions. Suitable solvents include lower aliphatic alcohols such as methanol, ethanol, propanol and isopropanol or mixtures of these solvents with higher boiling alcohols such as ethylene glycol, diethylene glycol, propylene glycol, dipropylene glycol, ethylene glycol monomethyl ether, ethylene glycol monoethyl ether, diacetone alcohol, n-butanol, sec. butanol, isobutanol and mixtures of these solvents with water. In some cases aromatic and aliphatic hydrocarbons, e.g. benzene, toluene, xylene and hexane can be used.

The coatings of the present invention generally exhibit adequate adhesion to marine surfaces protected by corrosion resistant finishes such as epoxy or vinyl based paints, to previously applied antifouling finishes and to polyester-fiberglass laminates. Typical of such finishes are those shown in Sparmann U.S. Pat. No. 2,970,923, Scott U.S. Pat. No. 3,214,279 and Robins U.S. Pat. No. 3,236,793.

The thickness of the coating applied will vary with the particular formulation employed and the method of application. It can be from 0.1 mil. to 250 mils. or more in thickness. Usually it will be between 0.3 mil. and 5 mils. The coatings can be applied to the marine surface, e.g. boat bottom or hull or wharf piling by any conventional procedure such as brushing, dipping, spraying, roller coating etc.

Coating applied at boat yards, marines or similar locations will normally be placed in water soon after drying. These coatings if made from linear, alcohol soluble polymers will remain alcohol soluble. However, as pointed out supra it is also possible to provide cured or crosslinked coatings which exhibit improved mechanical durability. There can be used the peroxide catalysts referred to supra alone, or as part of a 2-component catalyst system which is mixed into the coating solution immediately prior to application. Alternatively, the coating can be cured by incorporating a free radical initiator and heating the coated surface after drying.

Two component catalyst systems for effecting cure at ambient conditions, e.g. 20° C., include peroxides of the type referred to supra together with such amine accelerators as N,N-dimethylaminoethyl acetate, N,N-dimethyl aniline, N,N-dimethyl aminoethanol, N,N-dimethyl toluidine. The accelerator can be used in an amount of 0.05 to 1 part per part of peroxide, e.g. a mixture of 89% benzoyl peroxide and 11% dimethylaniline can be employed.

BRIEF DESCRIPTION OF THE DRAWING

The invention will be understood best in connection with the drawings wherein.

Figure 1:
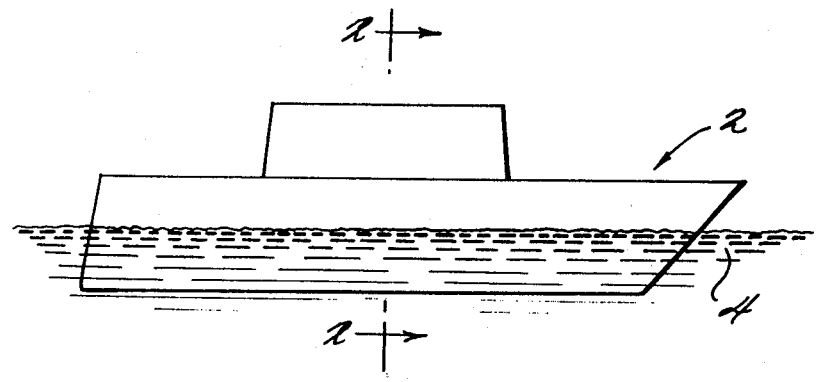
FIG. 1 shows a boat having a coating according to the invention.
Figure 2:
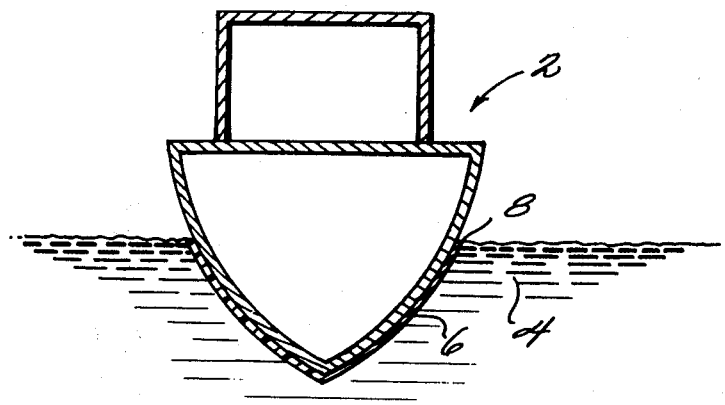
FIG. 2 is a sectional view along the line 2—2 of FIG. 1.

Referring more specifically to the drawings, the boat 2 in water 4 has a coating 6 of hydroxyethyl methacrylate polymer(or hydroxypropyl cellulose) below the water line 8. If desired, the entire boat can be coated with the polymer. The thickness of the coating 6 is greatly exaggerated for illustrative purposes.

DESCRIPTION OF THE PREFERRED EMBODIMENTS

EXAMPLE 1

2-hydroxyethyl methacrylate (50 parts) and $TiO_2$ (30 parts) are ground in a pebble mill to a fine powder (Hegeman 7–8). Additional 2-hydroxyethyl methacrylate (50 parts) is added along with ethylene glycol dimethylacrylate (0.2 part), cobalt naphthenate, a conventional metallic paint dryer or catalyst (0.1 part) and t-butyl peroctoate (0.4 part). The resulting viscous syrup is painted onto a wooden boat hull and cured at 20° to 35° C. The resulting protective marine coating is characterized by its ability to discourage barnacle and algae growth and corrosion on prolonged underwater exposure. Additionally it reduces the drag on moving the coated hull through water.

EXAMPLE 2

The procedure of Example 1 is repeated with the modification that the coating syrup is cast onto a steel hull and cured at 100° C. in the absence of cobalt naphthenate. The drag on moving the coated hull through water was reduced compared to an uncoated hull.

EXAMPLE 3

The procedure of Example 1 is repeated employing an isomeric mixture of hydroxy isopropyl methacrylate isomer in place of the hydroxyethyl methacrylate.

EXAMPLE 4

To a glass-lined reactor was charged 800 lbs. of ethanol, 200 lbs. of hydroxyethyl methacrylate and 0.5 lb. of t-butyl peroctoate. The reactor was flushed with nitrogen and heated to 80° C. over a period of 1 hour. The reactor was stirred at 80° C. for 7 hours, wherein 90% conversion of hydroxyethyl methacrylate to polymer was attained.

The resulting solution, containing 18% polymer by weight was used for the formulation of coatings for sailboats and motorboats below the water line. The boats were made of wood, metal and fiberglass (i.e., polyester impregnated fiberglass).

EXAMPLE 5

Example 4 was repeated using 20 lbs. of methyl methacrylate and 180 lbs. of hydroxyethyl methacrylate as the monomer charge. A conversion of 95% was attained in 7 hours. The resulting solution was used for the formulation of marine coatings in a similar fashion to example 4.

EXAMPLE 6

Example 4 was repeated using 80 lbs. of methyl methacrylate and 120 lbs. of hydroxyethyl methacrylate as the monomer charge. A conversion of 90% was attained in 6 hours. The resulting solution was used for the formulation of marine coatings in a similar fashion to example 4.

EXAMPLE 7

A 22 foot polyester fiberglass (Aqua Sport) equipped with a 100 horsepower outboard engine was operated at two different throttle settings between two buoys approximately 1 mile apart. Average times required to travel between buoys going in both directions were determined at each throttle setting. The boat was then removed from the water, the bottom was washed with fresh water and dried. The polymer solution of example 4 was applied with a roller to provide a dry coating thickness of 0.75 to 1.0 mil.

The boat was replaced in the water and the speed at the same throttle settings between the buoys was determined. The following results were obtained.

| Throttle Setting | Speed, knots Before Coating | Speed, knots After Coating |
|---|---|---|
| low | 10.5 | 12.0 |
| medium | 17.2 | 19.8 |

The results show a 13% reduction in drag resistance at a speed of about 10 knots and a 15% reduction at the higher speed.

EXAMPLE 8

The apparent viscosity of water at 23° C. was measuring using a Brookfield RVT Synrcolectric viscosimeter employing a No. 1 spindle at 100 R.P.M. The value obtained was 11.1 centipoises. The spindle was removed, dried, and was coated with the solution prepared in example 4 by dipping and allowing the spindle to drain and dry. The coating thickness was approximately 0.5 mil. The "apparent viscosity" of water at 23° C. was again measured at 100 R.P.M. using the coated spindle. A value of 10.7 centipoises was obtained. The peripheral speed of the No. 1 spindle at 100 R.P.M. is approximately 0.6 mile per hour. At this speed approximately 4% reduction in frictional resistance or drag was obtained.

EXAMPLE 9

A 9 foot polyester-fiberglass dinghy was towed behind a motor launch with a rope attached to a spring scale having a capacity of 10 kilograms. The dinghy was towed at 25 knots. An average force of 8 kilograms was noted on the scale. The dinghy was then removed from the water, rinsed with fresh water and dried. The dinghy was then brush coated with the polymer solution of example 4 to provide a 1.5 mil. coating, after drying, the dinghy was again towed at 25 knots. An average force of 6.5 kilograms was recorded on the scale. Thus, at 25 knots approximately 18% reduction in drag resistance was obtained.

EXAMPLE 10

Using a high-shear mixer, 200 grams of triphenyl lead acetate and 50 grams of titanium dioxide were dispersed in 8 kilograms of the polymer solution prepared in example 4. To the dispersion was added 2 kilograms of sec. butyl alcohol. A No. 1 spindle of a Brookfield Viscosimeter was coted with the dispersion by dipping and allowing to dry. An average coating thickness of 0.6 mil. was obtained. the apparent viscosity of water was measured in example 8. A value of 10.5 centipoises was obtained. The coating was removed from the spindle and the apparent viscosity was again determined. A value of 11.0 centipoises was obtained.

The coating composition prepared in example 10 was employed on sailing craft, both of the wood hull type and polyester-fiberglass laminate type to provide a fouling resistant drag reducing coating.

EXAMPLE 11

Example 4 was repeated using a monomer charge of 40 lbs. of hydroxypropyl acrylate and 160 lbs. of hydroxyethyl methacrylate. A conversion of 85% was received after 7 hours. The procedure of example 8 was repeated using this solution. Similar results were obtained. The solution of example 11 was also coated on the bottom of a metal bottomed motor launch to provide a drag reducing coating.

EXAMPLE 12

The procedure of example 11 was repeated replacing the hydroxypropyl acrylate by 40 lbs of acrylamide. Similar results were obtained.

EXAMPLE 13

To 500 grams of the coating dispersion of example 10 was added 2 grams of ethylene dimethacrylate (ethylene glycol dimethacrylate), 1 gram of bensoyl peroxide and 0.4 gram of N,N-dimethyl aniline. The coating was immediately applied to a polyester-fiberglass laminated boat hull surface. After drying and standing at 75° F. (about 24° C.) for 2 hours the coating merely swelled but did not dissolve in alcohol. The resulting coating was tougher when water swollen than the coating of example 10. It was also effective as a fouling resistant drag reducing coating for the boat bottom.

A number of antifouling experiments were carried out using the hydrophilic polymers of the present invention. After 6 months of testing on polyester resin panels the best results were obtained using triphenyl lead acetate as the active antifouling ingredient. The results were also superior to using the antifouling agent in formulations which did not include the hydrophilic polymer.

Most antifouling compositions now used on ocean-going vessels are based on the use of cuprous oxide pigment, a relatively inert material. A large proportion of the cuprous oxide is not effectively used because it is encapsulated in the resin and is unavailable unless the resin itself breaks down. A second disadvantage of cuprous oxide; is that it can induce galvanic corrosion. In addition because of its dark color, it is unsatisfactory as an antifouling ingredient for decorative finishes.

The United States Navy is, of course, interested in antifouling finishes. It would like to have a 2½ year minimum, but finds that cuprous oxide coatings last from 12–18 months. Another market for effective systems is on tankers and large freighters. The operators are constantly seeking ways to decrease fouling because even a small amount of extra drag on the hull makes an appreciable difference to the efficiency of the vessel, which has an important effect on the economics, particularly in tanker operations. In addition, there is a need for periodic removal from service for bottom cleaning.

During the past decade a number of organometallic and organic pesticides have been found to exhibit high activity against a broad spectrum of marine fouling organisms. Economic utilization of these chemical antifoulants in shipbottom formulations has not been successfully accomplished, however, primarily because of the encapsulation problem. The new anti-foulants are all several time more potent than cuprous oxide, but their relatively high cost dictates that they be employed at a fraction of the normal concentration of the latter cuprous oxide. Continuous contact between toxicant particles in the paint film is not maintained at these relatively low concentrations so that the toxicants are not even utilized as efficiently as cuprous oxide, which in turn is also partially inactivated by encapsulation. Modification of the paints with inert extender pigments or water-soluble resin constituents improves the efficiency of toxicant utilization, but degrades the physical integrity of the paint films to an intolerable degree. To date, the most successful compromise is represented by blends or organometallic anti-foulants with cuprous oxide to obtain durability and high potency. However, such blends eliminate the two major benefits offered by organic and organometallic antifoulants; freedom from the galvanic corrosion hazard of cuprous oxide, and flexibility of decorative pigmentation.

The use of hydrophilic water insoluble polymers of the present invention reduces the problem of encapsulation of active anti-foulants in impermeable resin systems due to the water swellable nature of the hydrophilic film. In other acrylic resins and in other types of resin systems, solid organic and organometallic antifoulants do not demonstrate any significant activity unless their concentration in the film exceeds a threshold of about 25% by weight of the resin. In the systems of the present invention activity at much lower concentrations is noticed indicating that the hydrophilic resin does not impermeably encapsulate the toxicant particles.

In the following examples, 14 – 16, Hydron-S is hydroxyethyl methacrylate homopolymer. Hema is an abbreviation for hydroxyethyl methacrylate.

EXAMPLE 14

This series of experiments was designed as an attempt to determine whether or not one of a variety of toxicants showed any activity against marine organisms when incorporated into unmodified Hydron-S films. Accordingly, ethanol solutions of Hydron-S containing concentrations of 2–32% of the active ingredients were applied to panels and immersed at a Miami Beach test facility. Three toxicants of different chemical type were selected: hexachlorophene (G11) tetrachloroisophthalonitrile (DAC-2787) and triphenyl lead acetate (TPLA). These solutions, which contained 14% Hydron, were applied by brush to panels of glass-reinforced polyester laminate which has been sanded to give a clean surface. The details of the formulations are given in Table 1.

These panels were observed at monthly intervals. After the first period, all three of the formulations showed some activity against marine organisms. The resin itself was inactive, as demonstrated by the control sample which rapidly became fouled. The G 11-containing series showed good protection with the exception of the panel containing the 2% active ingredient (the lowest level). DAC-2787 was described as moderately active while TPLA exhibited a degree of control described as "startling". The films were completely free of slimes, and silt, as well as macrofouling. In all cases, the physical integrity of the film was good. This was highly encouraging, since organo-lead compounds have not demonstrated useful levels of protection in coatings even though they are known to have broad-spectrum activity in sea-water when leached out of porous blocks.

After 5 months' immersion, the G 11 and DAC-2787 panels were removed because all had fouled extensively. However, the TPLA series was still performing well, and after six months the two films containing the most concentrated quantity of active ingredient (16% to 32%) were still rated as 100% effective at this time, the film containing 8% TPLA was rated 92%, the 4% film 84%, and the 2% coating, 36%. Complete results are summarized in Table 2.

TABLE I

HYDRON-S FORMULATIONS FIRST SERIES

| Formulation No. | Hydron-S | G 11 | DAC-2787 | TPLA | LTON |
|---|---|---|---|---|---|
| A (Control) | 13.8 | — | — | — | 86.2 |
| 1B | 13.7 | 0.3 | — | — | 86.0 |
| 1C | 13.7 | 0.6 | — | — | 85.7 |
| 1D | 13.6 | 1.2 | — | — | 85.2 |
| 1E | 13.4 | 2.6 | — | — | 84.0 |
| 1F | 13.0 | 6.1 | — | — | 80.9 |
| 2B | 13.7 | — | 0.3 | — | 86.0 |
| 2C | 13.7 | — | 0.6 | — | 85.7 |
| 2D | 13.6 | — | 1.2 | — | 85.2 |
| 2E | 13.4 | — | 2.6 | — | 84.0 |
| 2F | 13.0 | — | 6.1 | — | 80.9 |
| 3B | 13.7 | — | — | 0.3 | 86.0 |
| 3C | 13.7 | — | — | 0.6 | 85.7 |
| 3D | 13.6 | — | — | 1.2 | 35.2 |
| 3E | 13.4 | — | — | 2.6 | 84.0 |
| 3F | 13.0 | — | — | 6.1 | 80.9 |

TABLE 2

SUMMARY OF BEHAVIOR REPORTS OF EXPERIMENTAL SURFACES (Plates Immersed March 15 - Hydron-S Brush Coatings Containing Triphenyl Lead Acetate

| Antifoulants | Code | Overall Rating % | | | | |
|---|---|---|---|---|---|---|
| | | May | June | July | August | September |
| None | A | 37 | 0 | 0 | 0 | 0 |
| TPLA, 2% | 3B | 100 | 71 | 42 | 36 | 36 |
| TPLA, 4% | 3C | 100 | 92 | 90 | 90 | 84 |
| TPLA, 8% | 3D | 100 | 95 | 93 | 92 | 92 |
| TPLA, 16% | 3E | 100 | 100 | 100 | 100 | 100 |
| TPLA, 32% | 3F | 100 | 100 | 100 | 94* | 100 |

*Attributed to green algae which attached during prolific growth period but which did not persist. Physical condition of all coatings was rated "good" without physical defects, at time of September report.

EXAMPLE 15

Triphenyl lead acetate (TPLA) tests were also carried out at four concentrations from 2 to 16% by weight in Hydron-S and also in two copolymers (90% Hema-10% methyl methacrylate and 60% Hema-40% methyl methacrylate. The copolymers have lower levels of sea-water permeability than Hydron-S. These coatings were applied by both brush and doctor blade techniques. 8 inches × 10 inches aluminum alloy panels were employed in the testing of effectiveness against fouling. After one month the Hydron-S formulations performed better than the copolymers. Pigmentation of the Hydron-S did not detract from its performance.

TABLE 3

TPLA IN HYDRON-S AND 2 COPOLYMERS
(Grams per Liter of Paint)

| Paint No. | 1 | 2 | 3 | 4 | 5 | 6 |
|---|---|---|---|---|---|---|
| INGREDIENT | | | | | | |
| Hydron-S | 153 | 153 | 153 | 153 | — | — |
| 90% Hema-10% Ne Methacrylate | — | — | — | — | 153 | 153 |
| Triphenyllead Acetate | 11 | 21 | 42 | 81 | 11 | 21 |
| Iron Oxide | 240 | 240 | 240 | 240 | 240 | 240 |
| Talc | 130 | 115 | 85 | 30 | 130 | 115 |
| Ethanol | 614 | 614 | 614 | 614 | 614 | 614 |
| TOTAL | 1148 | 1143 | 1134 | 1118 | 1148 | 1143 |
| %TPLA | 2 | 4 | 8 | 16 | 2 | 4 |

| Paint No. | 7 | 8 | 9 | 10 | 11 | 12 |
|---|---|---|---|---|---|---|
| INGREDIENT | | | | | | |
| 90% Hema-10% Me Methacrylate | 153 | 153 | — | — | — | — |
| 60% Hema-40% Me Methacrylate | — | — | 153 | 153 | 153 | 153 |

TABLE 3-continued

TPLA IN HYDRON-S AND 2 COPOLYMERS
(Grams per Liter of Paint)

| Triphenyllead Acetate | 42 | 81 | 11 | 21 | 42 | 81 |
|---|---|---|---|---|---|---|
| Iron Oxide | 240 | 240 | 240 | 240 | 240 | 240 |
| Talc | 85 | 30 | 130 | 115 | 85 | 30 |
| Ethanol | 614 | 614 | 614 | 614 | 614 | 614 |
| TOTAL | 1134 | 1118 | 1148 | 1143 | 1144 | 1118 |
| %TPLA | 8 | 16 | 2 | 4 | 8 | 16 |

All Paints: Pigment Volume Content = 39.6 Non-volatiles volume = 24.55

TABLE 4

TPLA IN HYDRON-S AND 2 COPOLYMERS IMMERSION TEST RESULTS

| POLYMER | % TPLA | PATENT No. | PANEL No.* | ONE MONTH Physical Condition | % Rating O.P.** |
|---|---|---|---|---|---|
| Hydron-S | 2 | 1 | 1-1/c | Good | 95 |
| | | | 1-1/b | Good | 100 |
| | | | 1-2/c | Good | 100 |
| | | | 1-2/b | Good | 100 |
| | 4 | 2 | 2-3/c | Good | 100 |
| | | | 2-1/b | Good | 100 |
| | | | 2-2/c | Good | 100 |
| | | | 2-2/b | Good | 100 |
| | 8 | 3 | 3-1/c | Good | 100 |
| | | | 3-1/b | Good | 100 |
| | | | 3-2/c | Good | 100 |
| | | | 3-2/b | Good | 100 |
| | 16 | 4 | 4-1/c | Good | 100 |
| | | | 4-1/b | Good | 100 |
| | | | 4-2/c | Good | 100 |
| | | | 4-2/b | Good | 100 |
| 90/10 | 2 | 5 | 5-1/c | Blistering | 98 |
| | | | 5-1/b | Good | 100 |
| | | | 5-2/c | Good | 100 |
| | | | 5-2/b | Blistering | 60 |
| | 4 | 6 | 6-1/c | Blistering | 95 |
| | | | 6-1/b | Blistering | 70 |
| | | | 6-2/c | Good | 100 |
| | | | 6-2/b | Blistering | 65 |
| | 8 | 7 | 7-1/c | Good | 100 |
| | | | 7-1/b | Blistering | 40 |
| | | | 7-2/c | Blistering | 98 |
| | | | 7-2/b | Blistering | 20 |
| 90/10 | 16 | 8 | 8-1/c | Blistering | 70 |
| | | | 8-1/b | Blistering | 35 |
| | | | 8-2/c | Blistering | 50 |
| | | | 8-2/b | Blistering | 30 |
| 60/40 | 2 | 9 | 9-1/c | Blistering, Flaking | 25 |
| | | | 9-1/b | Blistering | 95 |
| | | | 9-2/c | Blistering, Flaking | 35 |
| | | | 9-2/b | Good | 100 |
| | 4 | 10 | 10-1/c | Blistering, Flaking | 70 |
| | | | 10-1/b | Good | 100 |
| | | | 10-2/c | Not Prepared | |
| | | | 10-2/b | Good | 100 |
| | 8 | 11 | 11-1/c | Blistering, Flaking (Correction eruptions on portions of bare aluminum) | 85 |
| | | | 11-1/b | Good | 100 |
| | | | 11-2/c | Blistering, Flaking (Correction eruptions on portions of bare aluminum) | 25 |
| | | | 11-2/b | Good | 100 |
| | 16 | 12 | 12-1/c | Not prepared | |
| | | | 12-1/b | Good | 100 |
| | | | 12-2/c | Not prepared | |
| | | | 12-2/b | Flaking | 75 |

*c = cost, b = brushed
**O.P. = Overall Performance

EXAMPLE 16

In another series of experiments, aluminum panels were prepared from Hydron-S solutions containing the following antifoulants:

| Test Panel Designation | Antifoulant |
|---|---|
| A. | Bis(tri-n-butyltin) oxide "TBTO" |
| B. | Triphenyltin chloride, "TPTCI" |
| C. | Tributyltin fluoride, "TBTI" |
| E. | Triphenyllead chloride, "TPLC" |
| F. | Triphenyllead laurate; "TPLL" |
| G. | 1,2,3-Trichloro-4,6-dinitrobenzene, "Vancide PB" |
| H. | Saturated solution of Vancide PB in PBTO. "PBTO" (ca 20.9% PB) |
| I. | 10,10'-Oxybisphenoxarsine, "SA-546" |
| J. | Mercurous chloride, Powder |
| K. | Cuprous oxide, Grade AA |

The formulations containing these antifoulants are shown in Table 5, and the results after one month's immersion in Table 6. Again, these results are from tests in sea-water at Miami, Florida.

Panels K4 and K16, each with cast and brushed films containing cuprous oxide on aluminum, were expected to show galvanic corrosion. Since cuprous oxide is of importance for comparison, additional K4 and K16 films were applied to glass-reinforced polyester panels. K4 replicates were brushed, and K16 cast because only the latter panels were flat enough to permit accurate film draw-down.

A number of the formulations show considerable interest, not only because of the protection afforded, but also because of the sizeable content of pigments.

TABLE 5

HYDRON-S SYSTEM CONTAINING 4 & 16% OF VARIOUS ANTIFOULANTS
(Grams For Liter of Paint)

| Paint No. | A/4 | A/16 | B/4 | B/16 | C/4 | C/16 |
|---|---|---|---|---|---|---|
| INGREDIENT | | | | | | |
| Hydron-S | 150 | 139 | 153 | 153 | 153 | 153 |
| TLTO | 22 | 100 | — | — | — | — |
| TPTCI | — | — | 21 | 75 | — | — |
| TBTF | — | — | — | — | 20 | 70 |
| Iron oxide | 240 | 240 | 240 | 240 | 240 | 214 |
| Talc | 145 | 145 | 105 | 1 | 99 | — |
| Ethanol | 601 | 556 | 614 | 614 | 614 | 614 |
| TOTAL | 1158 | 1180 | 1133 | 1083 | 1126 | 1051 |

| Paint No. | | | E/4 | E/16 | F/4 | F/16 |
|---|---|---|---|---|---|---|
| INGREDIENT | | | | | | |
| Hydron-S | | | 153 | 153 | 153 | 153 |
| TLIO | | | 21 | 81 | — | — |
| TPLL | | | — | — | 21 | 81 |
| Iron oxide | | | 240 | 240 | 240 | 240 |
| Talc | | | 115 | 30 | 115 | 30 |
| Ethanol | | | 614 | 614 | 614 | 614 |
| TOTAL | | | 1143 | 1118 | 1143 | 1118 |

| Paint No. | | | G/4 | G/16 | H/4 | H/16 | I/4 | I/16 |
|---|---|---|---|---|---|---|---|---|
| INGREDIENT | | | | | | | | |

TABLE 5-continued

HYDRON-S SYSTEM CONTAINING 4 & 16% OF VARIOUS ANTIFOULANTS
(Grams For Liter of Paint)

| | | | | | | |
|---|---|---|---|---|---|---|
| Hydron-S | 153 | 153 | 150 | 140 | 153 | 153 |
| Vancide PB | 21 | 78 | — | — | — | — |
| "PBTO" | — | — | 22 | 100 | — | — |
| SA 546 | — | — | — | — | 21 | 74 |
| Iron oxide | 240 | 240 | 240 | 240 | 240 | 235 |
| Talc | 110 | 15 | 145 | 145 | 103 | — |
| Ethanol | 614 | 614 | 602 | 560 | 614 | 614 |
| TOTAL | 1138 | 1100 | 1159 | 1185 | 1131 | 1074 |

| Paint No. | J/4 | J/16 | K/4 | K/16 |
|---|---|---|---|---|
| INGREDIENT | | | | |
| Hydron-S | 153 | 153 | 153 | 153 |
| Mercurous Chloride | 22 | 95 | — | — |
| Cuprous oxide | — | — | 22 | 96 |
| Iron oxide | 240 | 240 | 240 | 240 |
| Talc | 136 | 107 | 135 | 101 |
| Ethanol | 614 | 614 | 614 | 614 |
| TOTAL | 1165 | 1209 | 1164 | 1204 |

TABLE 6

HYDRON-S SYSTEM CONTAINING 4 & 16% OF VARIOUS ANTIFOULANTS IMMERSION TEST RESULTS

| ANTI-FOULANT | PAINT No. | PANEL No.* | ONE MONTH Physical Condition | % Rating O.P. |
|---|---|---|---|---|
| TBTO | A/4 | A4.1/c | Good | 95 |
| | | A4.1/b | Good | 95 |
| | | A4.2/c | Good | 95 |
| | | A4.2/b | Good | 95 |
| | A/16 | A16.1/c | Soft | 95 |
| | | A16.1/b | Soft | 93 |
| | | A16.2/c | Soft | 95 |
| | | A16.2/b | Soft | 98 |
| TPT Cl | B/4 | B4.1/c | Good | 100 |
| | | B4.1/b | Good | 100 |
| | | B4.2/c | Good | 100 |
| | | B4.2/b | Good | 100 |
| | B/16 | B16.1/c | Soft | 98 |
| | | B16.1/b | Soft | 98 |
| | | B16.2/c | Soft | 98 |
| | | B16.2/b | Soft | 98 |
| TBTF | C/4 | C4.1/c | Good | 95 |
| | | C4.1/b | Good | 95 |
| | | C4.2/c | Good | 95 |
| | | C4.2/b | Good | 95 |
| | C/16 | C16.1/c | Good | 100 |
| | | C16.1/b | Good | 100 |
| | | C16.2/c | Good | 100 |
| | | C16.2/b | Good | 100 |
| TPLC | E/4 | E4.1/c | Good | 95 |
| | | E4.1/b | Good | 95 |
| | | E4.2/c | Good | 100 |
| | | E4.2/b | Good | 100 |
| | E/16 | E16.1/c | Soft | 98 |
| | | E16.1/b | Soft | 98 |
| | | E16.2/c | Good | 100 |
| | | E16.2/b | Soft | 98 |
| TPLL | F/4 | F4.1/c | Good | 95 |
| | | F4.1/b | Good | 95 |
| | | F4.2/c | Good | 95 |
| | | F4.2/b | Soft | 95 |
| | F/16 | F16.1/c | Soft | 98 |
| | | F16.1/b | Good | 100 |
| | | F16.2/c | Soft | 98 |
| | | F16.2/b | Good | 100 |
| Vanicide PB | G/4 | G4.1/c | Good | 91 |
| | | C4.1/b | Good | 90 |
| | | C4.2/c | Good | 89 |
| | | G4.2/b | Good | 91 |
| | G/16 | G16.1/c | Good | 95 |
| | | G16.1/b | Good | 95 |
| | | G16.2/c | Good | 95 |
| | | G16.2/b | Good | 95 |
| PBTO | H/4 | H4.1/c | Good | 95 |
| | | H4.1/b | Good | 95 |
| | | H4.2/c | Good | 100 |
| | | H4.2/b | Good | 95 |
| PBTO | H/16 | H16.1/c | Good | 100 |
| | | H16.1/b | Good | 100 |
| | | H16.2/c | Good | 100 |
| | | H16.2/b | Soft | 95 |
| Dow SA-546 | I/4 | I4.1/c | Good | 100 |
| | | I4.1/b | Good | 100 |
| | | I4.2/c | Good | 100 |
| | | I4.2/b | Good | 100 |
| | I/16 | I16.1/c | Good | 100 |
| | | I16.1/b | Good | 100 |
| | | I16.2/c | Good | 100 |
| | | I16.2/b | Good | 100 |
| Mercurous Chloride | J/4 | J4.1/c | Good | 100 |
| | | J4.1/b | Good | 95 |
| | | J4.2/c | Good | 100 |
| | | J4.2/b | Good | 100 |
| | J/16 | J16.1/c | Blistering | 90 |
| | | J16.1/b | Blistering | 99 |
| | | J16.2/c | Blistering | 90 |
| | | J16.2/b | Blistering | 99 |
| Cuprous Oxide | K/4 | K4.1/c | Corr.eruption | 99 |
| | | K4.1/b | Good | 95 |
| | | K4.2/c | Good | 95 |
| | | K4.2/b | Good | 95 |
| | K/16 | K16.1/c | Corr.eruption | 99 |
| | | K16.1/b | Corr.eruption | 99 |
| | | K16.2/c | Corr.eruption | 99 |
| | | K16.2/b | Corr.eruption | 99 |

*b, brushed, c, cast.

In examples 14 through 16, the formulations containing pigments were prepared on a paint mill. All were applied (with the few exceptions indicated) to 6061-T6 anodized aluminum alloy by doctor-blade coating or brushing.

In the following examples phr means parts per hundred of resin.

EXAMPLE 17

To a 10% aqueous solution of hydroxyethyl cellulose was added 1.18 phr. (based on polymer) of ammonium dichromate. A portion of the solution was coated on a preweighed glass slide and allowed to dry and cure at room temperature. The weight of the dried coating was then determined and it was placed in water over night. The coated glass was blotted free of surface moisture and weighed. The coating had picked up 397% of its dry weight of water.

A separate portion of the solution was used to coat the streamlined dart as described below for determination of drag reduction.

EXAMPLE 18

Example 17 was repeated using hydroxypropyl cellulose in place of hydroxyethyl cellulose with 1.12 phr. of ammonium dichromate. The dried, cured coating picked up 590% of its weight on immersion in water for 18 hours.

EXAMPLE 19

To a 10% solution of polyvinyl pyrrolidone in ethanol was added 2 phr. of ammonium persulfate as a 10% aqueous solution. The solution was coated on preweighed aluminum foil and allowed to dry at room temperature. The film picked up 15 times its dry weight of water after 18 hours of immersion.

EXAMPLE 20

To a 10% aqueous solution of polyvinyl alcohol was added 2.36 phr. of ammonium dichromate. A dried film picked up 58.7% of its weight of water on immersion for 23 hours.

EXAMPLE 21

A 15% solution of cellulose acetate in containing 38.3% acetate was coated on a weighed piece of aluminum foil and allowed to dry. On immersion in water, the film picked up 20.4% of its dry weight of water.

EXAMPLE 22

A 10 ft. vertical glass column, 6 inches in diameter was equipped with an axially located electromagnet at the top, an axially positioned guide line down the length of the column and photo-electric cells coupled with a timing device at the bottom of the column. A streamlined aluminum dart having an axial hole through the center was positioned over the guide line. The column was filled with water. The dart was held at the top of the column by the electromagnet. A single switch, which turned off the current to the magnet releasing the dart, simultaneously turned on the timer. The interruption by the falling dart of the light beam between the photocells positioned at the bottom of the column turned off the timer.

The dart was timed without having coatings applied thereto, and was then timed with various coatings applied to its surface.

The average results (10 trials) obtained with the unseated dart and the dart with the coatings of examples 17 – 21 are as follows:

| Coating | Surface Material | %H$_2$O in Film | Drop Time seconds (Minutes) | Speed Increase % |
|---|---|---|---|---|
| None | Aluminum | | 1.217 | |
| Ex. 17 | Hydroxyethyl Cellulose | 403 | 1.183 | 2.8 |
| Ex. 18 | Hydroxypropyl cellulose | 593 | 1.179 | 3.1 |
| Ex. 19 | Polyvinyl Pyrrolidene | 1520 | 1.180 | 3.0 |
| Ex. 20 | Polyvinyl Alcohol | 57.8 | 1.176 | 3.4 |
| Ex. 21 | Cellulose Acetate | 20.4 | 1.185 | 2.6 |

In place of the hydroxyethyl methacrylate polymer solution of example 4 to coat sailboats and motorboats there can be used the hydroxyethyl cellulose solution of example 17, the hydroxypropyl cellulose solution of example 18, the polyvinyl pyrrolidone solution of example 19, the polyvinyl alcohol solution of example 20 or the hydrolyzed cellulose acetate solution of example 21.

Similarly, in place of the Hydron-S and the copolymers employed in examples 14, 15 and 16 there can be used the same weights of the polymers of examples 17, 18, 19, 20 or 21.

What is claimed is:

1. A marine structure which is a watercraft having an adherent continuous exposed coating consisting essentially of a member of the group consisting of (1) a water insoluble hydrophilic polymer which is swellable to an extent of at least 10% in water, said hydrophilic polymer being selected from the group consisting of hydrophilic cellulose esters, hydrophilic cellulose ethers, hydrophilic polyurethanes, hydrophilic vinyl lower alkyl ether polymers, vinyl alcohol group containing polymers, partially hydrolyzed polyacrylonitrile, ethylene-maleic anhydride copolymer, styrene-maleic anhydride copolymer, proteins, high molecular weight polyalkylene oxides and phenoxy resins and wherein the coating is sufficient to reduce the drag of the watercraft when in water and, (2) said hydrophilic polymer having encapsulated therein at least one member of the group consisting of anti-fouling agents and pigments.

2. A marine structure according to claim 1 including encapsulated in said hydrophilic polymer a member of the group consisting of anti-fouling agents and pigments.

3. A marine structure according to claim 1 including a minor amount up to 20% by weight of the polymer of a cross-linking agent.

4. A marine structure according to claim 1 wherein the hydrophilic polymer is swellable to an extent of at least 20% in water.

5. A marine structure according to claim 1 wherein the coating is a film having a thickness of 0.3 to 5 mils.

6. A marine structure according to claim 3 wherein said exposed coating is an outer coating and underneath said exposed outer coating is an inner coating comprising an anti-foulant, said hydrophilic film coating being sufficiently water absorbable to permit water to reach said anti-foulant coating and permit the anti-foulant to be gradually leached out.

7. A marine structure according to claim 1 wherein the hydrophilic polymer is normally water soluble but has been cross-linked sufficiently to render it water insoluble.

8. A marine structure according to claim 1 wherein the hydrophilic polymer is a water insoluble cellulose ether.

9. A marine structure according to claim 8 wherein the cellulose ether is a hydroxy lower alkyl ether.

10. A marine structure according to claim 9 wherein the cellulose ether is a hydroxymethyl cellulose.

11. A marine structure according to claim 9 wherein the cellulose ether is a hydroxypropyl cellulose.

12. A marine structure according to claim 8 wherein the cellulose ether is a carboxymethyl cellulose.

13. A marine structure according to claim 1 wherein the hydrophilic polymer is a partially hydrolyzed cellulose ester of a lower alkanoic acid.

14. A marine structure according to claim 13 wherein the cellulose ester is a cellulose acetate.

15. A marine structure according to claim 1 wherein the hydrophilic polymer is a water insoluble hydroxyl containing polyurethane.

16. A marine structure according to claim 1 wherein the hydrophilic polymer is a water insoluble vinyl lower alkyl ether.

17. A marine structure according to claim 1 wherein the hydrophilic polymer contains vinyl alcohol groups and is water insoluble.

18. A marine structure according to claim 17 wherein the vinyl alcohol group containing polymer is a water insoluble polyvinyl alcohol.

19. A marine structure according to claim 17 wherein the vinyl alcohol group containing polymer is a hydrolyzed ethylene-vinyl acetate copolymer.

20. A marine structure according to claim 17 wherein the vinyl alcohol group containing polymer is a polyvinyl acetal.

21. A marine structure according to claim 1 wherein the polymer is partially hydrolyzed polyacrylonitrile.

22. A marine structure according to claim 1 wherein the polymer is an ethylene-maleic anhydride copolymer.

23. A marine structure according to claim 1 wherein the polymer is a styrene-maleic anhydride copolymer.

24. A marine structure according to claim 1 wherein the polymer is a vinyl alkyl ether-maleic anhydride copolymer.

25. A marine structure according to claim 1 wherein the polymer is a protein.

26. A marine structure according to claim 1 wherein the polymer is a high molecular weight poly lower alkylene oxide.

27. A marine structure according to claim 1 wherein the polymer is a phenoxy resin.

28. A method of increasing the speed of watercraft comprising moving said watercraft through water while having on the watercraft below the waterline the continuous coating set forth in claim 1.

29. A method according to claim 28 wherein said exposed coating is an outer coating and underneath said exposed outer coating is an inner coating comprising an anti-foulant, said hydrophilic film coating being sufficiently water absorbable that water reaches said anti-foulant and the anti-foulant is gradually leached out while the watercraft is in the water.

30. A method according to claim 28 wherein the hydrophilic polymer is normally water soluble, but has been cross-linked sufficiently to render it water insoluble.

31. A method according to claim 28 wherein the hydrophilic polymer is a water insoluble cellulose ether.

32. A method according to claim 28 wherein the hydrophilic polymer is a partially hydrolyzed cellulose ester of a lower alkanoic acid.

33. A method according to claim 28 wherein the hydrophilic polymer is a water insoluble hydroxyl containing polyurethane.

34. A method according to claim 28 wherein the hydrophilic polymer is a water insoluble vinyl lower alkyl ether.

35. A method according to claim 28 wherein the hydrophilic polymer contains vinyl alcohol groups and is water insoluble.

36. A method according to claim 28 wherein the polymer is a high molecular weight poly lower alkylene oxide.

37. A method according to claim 28 wherein the polymer is a phenoxy resin.

38. A method according to claim 28 wherein the continuous film has a thickness of 0.3 to 5 mils.

39. A marine structure according to claim 1 wherein the coating has encapsulated therein an anti-fouling agent.

40. A marine structure according to claim 39 wherein the coating is a film having a thickness of 0.3 to 5 mils.

41. A marine structure according to claim 39 wherein the hydrophilic polymer is normally water soluble, but has been cross-linked sufficiently to render it water insoluble.

42. A marine structure according to claim 39 wherein the hydrophilic polymer is a water insoluble cellulose ether.

43. A marine structure according to claim 42 wherein the cellulose ether is a hydroxy lower alkyl ether.

44. A marine structure according to claim 42 wherein the cellulose ether is a carboxymethyl cellulose.

45. A marine structure according to claim 39 wherein the hydrophilic polymer is a partially hydrolyzed cellulose ester of a lower alkanoic acid.

46. A marine structure according to claim 39 wherein the hydrophilic polymer is a water insoluble hydroxyl containing polyurethane.

47. A marine structure according to claim 39 wherein the hydrophilic polymer is a water insoluble vinyl lower alkyl ether.

48. A marine structure according to claim 39 wherein the hydrophilic polymer contains vinyl alcohol groups and is water insoluble.

49. A marine structure according to claim 48 wherein the vinyl alcohol group containing polymer is a water insoluble polyvinyl alcohol.

50. A marine structure according to claim 48 wherein the vinyl alcohol group containing polymer is a hydrolyzed ethylene-vinyl acetate copolymer.

51. A marine structure according to claim 39 wherein the polymer is a high molecular weight poly lower alkylene oxide.

52. A marine structure according to claim 39 wherein the polymer is a phenoxy resin.

53. A marine structure according to claim 1 wherein the hydrophilic polymer is swellable to an extent of 20 to 120% in water.

54. A marine structure according to claim 1 wherein said hydrophilic polymer is selected from the group consisting of hydrophilic cellulose esters, hydrophilic cellulose ethers, hydrophilic polyurethanes, vinyl alcohol group containing polymers, ethylene-maleic anhydride copolymer, styrene-maleic anhydride copolymer, proteins, high molecular weight polyalkylene oxides and phenoxy resins.

55. A marine structure according to claim 54 including a minor amount up to 20% by weight of the polymer of a cross-linking agent.

56. A marine structure according to claim 54 wherein the hydrophilic polymer is swellable to an extent of at least 20% in water.

57. A marine structure according to claim 54 wherein the coating is a film having a thickness of 0.3 to 5 mils.

58. A marine structure according to claim 57 wherein underneath said exposed coating is an inner coating comprising an anti-foulant, said hydrophilic film coating being sufficiently water absorbable to permit water to reach said anti-foulant coating and permit the anti-foulant to be gradually leached out.

59. A method of increasing the speed of watercraft comprising moving said watercraft through water while having on the watercraft below the waterline the continuous coating, set forth in claim 54.

60. A method according to claim 59 wherein said exposed coating is an outer coating and underneath said exposed outer coating is an inner coating comprising an anti-foulant, said hydrophilic film coating being, sufficiently water absorbable that water reaches said anti-foulant and the anti-foulant is gradually leached out while the watercraft is in the water.

61. A marine structure according to claim 54 wherein the coating has encapsulated therein an anti-fouling agent.

62. A marine structure according to claim 1 wherein the coating has encapsulated therein an anti-fouling agent and the hydrophilic polymer is a member of the group consisting of ethylene-maleic anhydride copolymer and styrene-maleic anhydride copolymer.

* * * * *